2,819,174

STABLE AQUEOUS TITANIA MONOHYDRATE DISPERSIONS

Richard D. Vartanian, Bound Brook, N. J., assignor to American Cyanamid Company, New York, N. Y., a corporation of Maine No Drawing. Application November 25, 1953
Serial No. 394,513

13 Claims. (Cl. 106—300)

This invention relates to aqueous dispersions of charged titania monohydrate with a particle size less than about 0.1 micron and to the process of preparing the same and to the use of said charged hydrous titania aqueous dispersions in the treatment of textile materials such as textile fibers and fabrics such as flat fabrics and pile fabrics, for the purpose of imparting soil resistant properties thereto.

One of the objects of the present invention is to produce a charged hydrous titania in aqueous dispersions wherein the titania monohydrate has a particle size less than about 0.1 micron. A further object of the present invention is to produce a negatively charged hydrous titania aqueous dispersion of the type described hereinabove which is used in the treatment of textile materials such as textile fibers, and fabrics such as flat fabrics and pile fabrics for the purpose of imparting soil resistant properties thereto. These and other objects of the present invention will be discussed more fully hereinbelow.

In preparing the charged hydrous titania aqueous dispersion of the present invention, one neutralizes an aqueous titania hydrate slurry to a pH of about 7.0–7.2. The titania monohydrate slurry is derived from the titanium ore which has been digested in sulfuric acid; then hydrolyzed, filtered, washed, reslurried and washed again in a conventional Moore filter until the so-called third Moore filter cake is derived. This filter cake is reslurried and then neutralized as indicated hereinabove to a pH of about 7.0–7.2. The neutralized slurry is then filtered and washed with water so as to remove substantially all of the sulfate ions from the filter cake. The desulfated filter cake is reslurried in water and acidified to a pH below 5 with a monobasic inorganic acid such as hydrochloric, hydroiodic, hydrobromic, hydrofluoric, nitric, nitrous and the like. This acidifying step produces an opalescent milky liquid. The crux of the invention resides in the adjustment of the pH to a value greater than 5 and preferably between 5 and 11. For optimum operating conditions, the pH is preferably adjusted to 7–9.5. The materials utilized in the adjustment of the pH are critical. They must be organic amines as inorganic alkalizing agents such as sodium hydroxide, potassium hydroxide and the like, will not produce the desired result when used alone but instead form a precipitate. Still further, certain amines cannot be used alone. Those amines which will work in this critical step when used alone are the water soluble acyclic alkyl monoamines and water soluble acyclic alkanol monoamines including the water soluble acyclic alkyl alkanol monoamines. Representative members of this class of water soluble acyclic amines are monomethyl amine, monoethyl amine, mono n-propyl amine, monoisopropyl amine, n-butyl amine, secondary butyl amine, isobutyl amine, tertiary butyl amine, n-amyl amine, isoamyl amine, tertiary amyl amine, dimethyl amine, diethyl amine, dipropyl amine, dibutyl amine, methanol amine, ethanol amine, propanol amine, butanol amine, dimethanol amine, dibutanol amine, methyl methanol amine, methyl ethanol amine, methyl isopropanol amine, ethyl isopropanol amine, ethyl butanol amine, and the like. Obviously, these water soluble amine may be used either singly or in combination with one another.

When the mixture of an acid such as a water soluble organic acid and/or an inorganic water soluble polybasic acid and a water soluble organic amine is utilized, the desired results are obtained; and the positive charges on the dispersed particles are changed to negative charges. The acid component of the mixture may be citric, tartaric, glycolic, gluconic, lactic, acetic, oxalic, phosphoric, orthophosphoric, sulfuric, sulfurous and the like. Obviously, these acids may be used either singly or in combination with one another in the mixture with the water soluble amines.

The amines which may be utilized in combination with the acids set forth hereinabove in the practice of the process of the present invention include all of those specifically enumerated hereinabove and, in addition thereto, such amines as diethylene triamine, triethylene tetramine, tetraethylene pentamine, hexamethylene tetramine, triethanol amine, morpholine and the like. Obviously, these amines may be used either singly or in combination with one another in the mixture with the acids such as those specifically enumerated hereinabove.

In order that the present invention may be more completely understood, the following examples are set forth in which all parts are parts by weight except where otherwise indicated. These examples are set forth primarily for the purpose of illustration and any specific enumeration of detail contained therein should not be interpreted as a limitation on the case except as indicated in the appended claims.

Example 1

Into a suitable reaction vessel equipped with a stirrer, there is introduced 6000 parts of a titania monohydrate slurry (third Moore filter cake, slurried with water), containing 1890 parts of anhydrous titanium oxide. While continuously stirring the charge, 600 parts of iron-free water and 575 parts of a 14% ammonium hydroxide solution are added. After thoroughly stirring to a pH of about 7.2, the neutralized slurry is filtered through a Büchner funnel and washed with iron-free water until the filtrate is substantially completely free of $SO_4$ ions. The filter cake has a calcined solids content of 38%. 4210 parts of the filter cake is diluted with 2190 parts of iron-free water. While stirring the diluted filter cake at a slow speed, there is added 220 parts of a concentrated hydrochloric acid (37–28% HCl). The stirring is continued for about 30 minutes after the acid addition until an opalescent milky liquid is obtained. The resulting colloidal dispersion has a $TiO_2$ content of 24.2%.

Example 1A 87.2 parts of the acid peptized titania monohydrate, thus prepared, are added with constant stirring to a solution containing 1.5 parts of citric acid dissolved in 7.5 parts of water. There is then added rapidly, 3 parts of monoisopropyl amine diluted with 5.3 parts of water with a high speed stirring. After the addition is completed, the stirring is continued for 5 minutes. The resulting product is a thixotropic colloidal dispersion having a pH of 7.8. When one drop of this dispersion is added to a small quantity of water, an opalescent colloidal suspension containing negatively charged titania monohydrate is obtained having a particle size less than 0.1 micron.

Example 2

5 parts of the neutralized colloidal titania monohydrate prepared in accordance with Example 1A are dispersed in 95 parts of water and transferred to a shallow container. A piece of white wool rug is placed face down in the dispersion, the depth of the charge is sufficient to wet the pile only. This gives a wet pick-up of about 50% by weight based on the total weight of the rug which is equivalent to about 100% wet pick-up based on the total weight of the pile. The thus treated rug is dried at 100° C. in a forced draft oven. The treated piece and an untreated control are fastened to two 5" x 5" windows in a revolving drum for the purpose of exposing the treated and control pieces to soil. Two grams of a synthetic soil is entered into the drum, the opening is closed and the drum is rotated for 20 minutes. The samples are then removed, vacuum cleaned and the treated sample is compared with the control in order to evaluate the effectiveness of the treatment for imparting soil resistance. The treated carpet is light gray in color while the untreated carpet is practically black.

Example 3

The procedure of Example 2 is repeated using an undyed wool rug and then tested for soil resistance by the produce described in Example 2. The treated material shows excellent soil resistance when compared with an untreated sample.

Example 4

A solution containing 1.5 parts of citric acid dissolved in 7.5 parts of water is added to 5.3 parts of water containing 3 parts of monoisopropyl amine. 82.7 parts of acid peptized titania monohydrate prepared according to Example 1 are added rapidly to the above solution using high speed stirring which is continued for 5 minutes after the addition has been completed. The resulting product is a white colloidal dispersion, which on dilution with water gives an opalescent colloidal dispersion having particle size of less than 0.1 micron. The pH of the finished product is 7.7.

Example 5

Example 1A is repeated except that in the place of the citric acid solution, there is substituted 2.1 parts of a 70% glycolic acid solution and 6.9 parts of water. The resulting colloidal dispersion has a pH of 9.1.

Example 6

Example 1A is repeated except that in the place of the citric acid solution, there is substituted 3 parts of a 50% gluconic acid and 6 parts of water. The resulting colloidal dispersion has a pH of 9.7.

Example 7

Example 1A is repeated except that in the place of the citric acid, there is substituted an equal amount of tartaric acid. The resulting colloidal dispersion has a pH of 8.7.

Example 8

Example 1A is repeated except in the place of citric acid, there is substituted an equivalent amount of an 85% solution of orthophosphoric acid.

Example 9

Example 1A is repeated except that in the place of the monoisopropyl amine solution, there is substituted a solution containing 5.5 parts of diethanol amine and 2.8 parts of water. The resulting colloidal dispersion has a pH of 7.7.

Example 10

82.7 parts of the acid peptized titania hydrate prepared in Example 1 are added with constant stirring to a solution containing 1.5 parts of an 85% orthophosphoric acid solution in water, 5.8 parts of diethanol amine and 10 parts of water. The stirring is continued after the addition is completed for about 5 minutes. The resulting colloidal dispersion has a pH of 8, is thixotropic and has a particle size less than 0.1 micron.

Example 11

82.7 parts of the acid peptized titania hydrate prepared according to Example 1 are added with stirring to a solution containing 1.5 parts of 85% orthophosphoric acid and 5 parts of water. To this acidified dispersion, there is then added with high speed constant stirring a solution containing 9.8 parts of water, 3 parts of diethanol amine and 3 parts of concentrated ammonium hydroxide (28% NH$_3$). The resulting colloidal dispersion is thixotropic and has a pH of 8.1.

Example 12

55.4 parts of the acid peptized titania hydrate prepared according to Example 1 are added with constant stirring to a solution containing 1 part of 85% orthophosphoric acid and 5 parts of water. To the acidified dispersion, there is added with high speed stirring a solution containing 3.9 parts of diethanol amine and 12.7 parts of water. The stirring is continued after the addition is complete for about 5 minutes. 22 parts of Ludox (a 30% colloidal dispersion of silica in water) is added with constant stirring which is continued for 5 minutes after the addition is completed. The resulting colloidal dispersion is thixotropic and has a pH of 8.4.

Example 13

82.7 parts of the acid peptized titania hydrate prepared according to Example 1 is added with constant stirring to a solution containing 3 parts of a 50% gluconic acid and 5 parts of water. To this acidified dispersion, there is then added with constant stirring, a solution containing 6 parts of isopropanol amine and 3.3 parts of water. The mixing is continued after the addition is completed for about 5 minutes. The resulting colloidal dispersion is thixotropic and has a pH of 7.9.

Example 14

Example 13 is repeated except that an equivalent amount of triethanol amine is substituted in the place of isopropanol amine. The resulting colloidal dispersion is very slightly thixotropic and has a pH of 7.4.

Example 15

82.7 parts of the acid peptized titania hydrate, prepared in accordance with Example 1 are added with constant stirring to a solution containing 3 parts of a 50% gluconic acid and 5 parts of water. To this acidified dispersion, there is added with constant stirring a solution containing 2.8 parts of monoethanol amine and 6.5 parts of water. The mixing is continued for about 5 minutes after the addition is completed. The resulting colloidal dispersion is very slightly thixotropic and has a pH of 8.0

Example 16

82.7 parts of the acid peptized titania hydrate prepared according to Example 1 are added with constant stirring to a solution containing 3 parts of 50% gluconic acid and 5 parts of water. To the acidified dispersion, there is added, with constant stirring, a solution containing 3.3 parts of ethyl monoethanol amine and 6 parts of water. The mixing is continued after the addition is completed for about 5 minutes. The resulting collodial dispersion is very slightly thixotropic and has a pH of 8.0.

Example 17

200 parts of a titania monohydrate slurry (a third Moore filter cake slurried with water) containing 50% of TiO$_2$ are mixed with 125 parts of deionized water and a solution containing 23.6 parts of AlCl$_3$.6H$_2$O dissolved in 200 parts of deionized water. The dispersion is heated to about 38–40° C. While continuously stirring, there is added 70 parts of concentrated ammonium hydroxide solution (containing 28% NH$_3$). The temperature is held at about 38–40° C., and the stirring continued for 30 minutes. The dispersion is suction filtered and washed with deionized water until the filtrate is substantially free of SO₄. 122 parts of a filter cake having a calcined solids content of 41% are obtained. 17 parts of concentrated hydrochloric acid (37–38% HCl) are stirred into the filter cake and the stirring is continued for about 1 hour. The resulting colloidal dispersion of the coprecipitated titania hydrate-alumina hydrate is diluted with 61 parts of deionized water to give a total of 200 parts of colloidal dispersion containing 50 parts of the coprecipitated $TiO_2Al_2O_3$ 80 parts of the acid peptized colloidal dispersion thus prepared are added with constant stirring to a solution containing 1 part of anhydrous citric acid dissolved in 8 parts of deionized water. To this acidified dispersion, there is added a solution containing 5.5 parts of monoisopropyl amine and 5.5 parts of deionized water. After the addition is complete, the stirring is continued for about 5 minutes. The resulting product is a colloidal dispersion having a pH of 8.0.

The particle size of the titania hydrate in the dispersion should be less than about 0.1 micron and preferably, for commercial operations, between about 0.02 and 0.075 micron. The amount of solids of the titania hydrate which may be utilized in the treatment of textile fibers and fabrics will cover a rather wide range such as between about 0.1 and 5% by weight based on the total weight of the aqueous dispersion. It is preferred, however, that the concentration of solids in the dispersion be between about 0.5 and 1.5% by weight. For optimum operability and results, the concentration is generally held at about 1% solids by weight. The particle size in any given dispersion will not be completely uniform but it is imperative that the size of the particles in the dispersion be less than about 0.1 micron.

The textile treating process of the present invention may be applied to fibers such as wool, silk, cotton, linen, and synthetic fibers such as those derived from linear super polyamides, linear polyesters, polyacrylonitrile and the like and fabrics containing these fibers and mixtures thereof.

In addition to imparting soil resistance to the treated fibers, the process of the present invention also imparts slip resistance to the fibers and also produces fibers which are free of the defect of whitening, particularly when the treatment is applied to black dyed fabrics or those dyed with dark shades. By practicing the process of the present invention, the charged hydrous titanium dioxide suspension is applied to fibers, wherein the suspension is composed of particles which are so small that the suspension is practically colorless. This is advantageous inasmuch as the titania monohydrate particles impart this soil resistant characteristic to the fibers without displaying any whitening of the fabric. A further advantage of the present inventon resides in the fact that these negatively charged dispersions are stable even in concentrated form and can be stored for long periods of time at room temperature without aggregation or separation thus making it possible to prepare these dispersions in advance of their use. A still further advantage, of the present invention resides in the fact that these dispersions can be diluted easily without separation or precipitation. A still further advantage of the present invention resides in the fact that the titanium dioxide hydrate suspension is comprised of particles of such minute size that maximum soil resistance can be obtained with a minimum of solids take-up. This means that the process can be carried out at a minimum of additional cost and yet produce these very desirable results. As an additional advantage of the present invention, good slippage control is obtained without appreciably increasing the weight and stiffness of the fabrics so treated. A further advantage of the present invention resides in the fact that the treating composition can be applied to the fabrics from a single bath.

The treating agent may be applied to the fibrous materials by any one of a plurality of conventional treating methods such as by immersion, spraying, or passing the fabric in contact with a quetch-roll, which travels in the suspension and carries a film of the treating agent up to and onto the fabric. So called flat fabrics or woven carpets (which do not contain a pile) may be immersed in the dispersion and then passed through a wringer to give about 100% wet pick-up by weight based on the weight of the fabric. Pile fabrics, on the other hand, may be passed over a roll with the pile down in such a manner that the pile is just close enough to the surface of the dispersion so that the pile is wetted without contacting the adhesive binding on the back of the fabric. Such a bath may be maintained at the desired height by utilizing an overflow pipe. Regardless of the manner in which the dispersion is applied to the fabric, the treated fabric is always dried by some conventional means such as by passing the treated fabric over stenters or through hot flues or in loop driers. Pile fabrics should be dried on conventional equipment designed for this purpose in order that the pile remains upright and is not damaged by the aqueous treatment. It is not known exactly how the colloid titania operates to reduce the soiling. Microscopic examination of the fiber fails to indicate the presence of a continuous film on the fiber of the treated material.

In practice of the process of the present invention, the drying of the impregnated fibers or fabrics can be done at temperatures between about 80 and 115° C. Lower temperatures may be used but they would necessitate lengthening the drying time and, as a consequence, should be avoided. Temperatures higher than 115° C. may also be used but because of the tendency toward the yellowing of the fabrics, these higher temperatures should be avoided particularly when drying white or light colored fabrics. The drying time will depend upon the temperature selected as well as the relative humidity of the air used for drying. Obviously, with the lower temperatures and higher humidities, the time will be considerably longer than when higher temperature and low humidities are used. The important thing to be observed is that the drying be continued until the treated fabric is dry to touch. Those skilled in the art will readily be able to adjust their drying times and the temperatures in order to produce a dried fabric. The drying time, then, may vary between about 5 minutes and 60 minutes, depending upon the other relating conditions. Overdrying to any significant extent is preferably avoided.

I claim:

1. A process which comprises acidifying a substantially sulfate-ion-free aqueous suspension of titania hydrate to a pH below about 5 with a monobasic inorganic acid and thereafter changing the pH of the suspension to a value between 5 and 11 with an alkalizing agent of the group consisting of water-soluble acyclic alkyl monoamines, water-soluble acyclic alkanol monoamines, water-soluble amines in stoichiometric excess in combination with water-soluble aliphatic acids, and water-soluble amines in stoichiometric excess in combination with water-soluble polybasic inorganic acids to produce a stable colloidal suspension of charged titania monohydrate particles having a substantially uniform particle size less than about 0.1 micron.

2. A process which comprises acidifying a substantially sulfate-ion-free aqueous suspension of titania hydrate to a pH below about 5 with a monobasic inorganic acid and thereafter changing the pH of the suspension to a value between 7 and 9.5 with an alkalizing agent of the group consisting of water-soluble acyclic alkyl monoamines, water-soluble acyclic alkanol monoamines, water-soluble amines in stoichiometric excess in combination with water-soluble aliphatic acids, and water-soluble amines in stoichiometric excess in combination with water-soluble polybasic inorganic acids to produce a stable colloidal suspension of charged titania monohydrate particles having a substantially uniform particle size less than about 0.1 micron.

3. A process according to claim 1 in which said alkalizing agent comprises isopropylamine.

4. A process according to claim 1 in which said alkalizing agent comprises ethyl ethanolamine.

5. A process according to claim 1 in which said alkalizing agent comprises ethylamine.

6. A process according to claim 1 in which said alkalizing agent comprises dimethylamine.

7. A stable colloidal suspension of charged substantially uniform titania monohydrate particles less than about 0.1 micron in size dispersed in an aqueous medium of pH between about 5 and about 11 and containing a monobasic inorganic acid and an alkalizing agent of the group consisting of water-soluble acyclic alkyl monoamines, water-soluble acyclic alkanol monoamines, water-soluble amines in stoichiometric excess in combination with water-soluble aliphatic acids, and water-soluble amines in stoichiometric excess in combination with water-soluble polybasic inorganic acids.

8. A composition according to claim 7 in which the alkalizing agent comprises isopropylamine.

9. A composition according to claim 7 in which the alkalizing agent comprises ethyl ethanolamine.

10. A composition according to claim 7 in which the alkalizing agent comprises ethylamine.

11. A composition according to claim 7 in which the alkalizing agent comprises dimethylamine.

12. A process according to claim 1 in which the suspension also contains hydrous alumina.

13. A composition according to claim 7 which also contains hydrous alumina.

References Cited in the file of this patent

UNITED STATES PATENTS

| | | |
|---|---|---|
| Re. 16,956 | Blumenfeld | May 8, 1928 |
| 1,797,760 | De Rohden | Mar. 24, 1931 |
| 1,980,429 | Parkinson | Nov. 13, 1934 |
| 2,220,966 | Krchma | Nov. 12, 1940 |
| 2,448,683 | Peterson | Sept. 7, 1948 |
| 2,622,307 | Cogovan | Dec. 23, 1952 |